(12) United States Patent
Nakai et al.

(10) Patent No.: US 8,532,455 B2
(45) Date of Patent: Sep. 10, 2013

(54) OPTICAL FIBER

(75) Inventors: Tadahiko Nakai, Hyogo (JP); Takaharu Kinoshita, Hyogo (JP); Takeshi Satake, Hyogo (JP); Takeji Akutsu, Hyogo (JP); Motohiko Yamasaki, Hyogo (JP)

(73) Assignee: Mitsubishi Cable Industries, Ltd., Tokyo (JP)

( * ) Notice: Subject to any disclaimer, the term of this patent is extended or adjusted under 35 U.S.C. 154(b) by 384 days.

(21) Appl. No.: 12/811,716

(22) PCT Filed: Dec. 19, 2008

(86) PCT No.: PCT/JP2008/003874
§ 371 (c)(1),
(2), (4) Date: Jul. 6, 2010

(87) PCT Pub. No.: WO2009/090712
PCT Pub. Date: Jul. 23, 2009

(65) Prior Publication Data
US 2011/0135260 A1    Jun. 9, 2011

(30) Foreign Application Priority Data
Jan. 16, 2008    (JP) ................. 2008-007358

(51) Int. Cl.
*G02B 6/02* (2006.01)
*G02B 6/10* (2006.01)
*G02B 6/32* (2006.01)

(52) U.S. Cl.
USPC ............. 385/128; 385/31; 385/33; 385/38; 385/123; 385/124; 385/126; 385/127; 385/141; 385/144; 385/146

(58) Field of Classification Search
USPC ........................................ 385/128, 146
See application file for complete search history.

(56) References Cited

U.S. PATENT DOCUMENTS

| | | | | |
|---|---|---|---|---|
| 5,333,232 | A * | 7/1994 | Yanagawa et al. | 385/127 |
| 5,482,525 | A * | 1/1996 | Kajioka et al. | 65/398 |
| 5,822,488 | A * | 10/1998 | Terasawa et al. | 385/127 |
| 6,004,315 | A | 12/1999 | Dumont | |
| 6,179,830 | B1 | 1/2001 | Kokubu | |
| 6,324,326 | B1 * | 11/2001 | Dejneka et al. | 385/123 |
| 6,477,296 | B1 * | 11/2002 | Ogawa | 385/31 |
| 2009/0252468 | A1 * | 10/2009 | Sugizaki et al. | 385/123 |

FOREIGN PATENT DOCUMENTS

| | | | |
|---|---|---|---|
| JP | 57-20703 | | 2/1982 |
| JP | 58-145901 | | 8/1983 |
| JP | 59-137069 | | 6/1984 |
| JP | 62-180311 | * | 8/1987 |

(Continued)

OTHER PUBLICATIONS

International Search Report for corresponding International No. PCT/JP2008/003874 dated Jan. 16, 2009.

(Continued)

*Primary Examiner* — Ryan Lepisto
(74) *Attorney, Agent, or Firm* — Renner, Otto, Boisselle & Sklar, LLP

(57) ABSTRACT

An optical fiber includes a core (1*a*) having an oblong rectangular or square cross section and made of quartz, a cladding (2) surrounding the core (1*a*), having a circular outer cross-sectional shape, having a lower refractive index than the core (1*a*), and made of resin, and a support layer (3) surrounding the cladding (2) and made of quartz.

5 Claims, 3 Drawing Sheets

(56) References Cited

FOREIGN PATENT DOCUMENTS

| JP | 63-311946 | 12/1988 |
| JP | 3-49591 | 7/1991 |
| JP | 4-144943 | 5/1992 |
| JP | 05-288967 | 11/1993 |
| JP | 10-33549 | 2/1998 |
| JP | 2001-502438 | 2/2001 |
| JP | 2003-131047 | 5/2003 |
| JP | 2005-049693 | 2/2005 |

OTHER PUBLICATIONS

International Search Report for corresponding International Application No. PCT/JP2008/003874 dated Jan. 16, 2009.
International Search Report for International Application No. PCT/JP2008/003873 dated Jan. 9, 2009.
Co-pending U.S. Application filed on Jul. 2, 2010.

* cited by examiner

OPTICAL FIBER

TECHNICAL FIELD

The present invention relates to optical fibers, and more particularly relates to an optical fiber for a laser guide used to transmit laser beams.

BACKGROUND ART

Laser guides have been widely used, as optical fiber components for transmitting laser beams with high energy density, for machining equipment, etc.

Incidentally, laser machining for a surface ablation process for semiconductor, etc., using a laser beam emitted through a laser guide requires that the intensities of a laser beam at the spot irradiated with the laser beam be uniform.

A conventional optical fiber including, e.g., a core having a circular cross section, and a cladding surrounding the core is configured such that the distribution of the intensities of a laser beam at the spot irradiated with the laser beam corresponds to a Gaussian distribution. Therefore, in order to obtain uniform intensities of the laser beam at such an irradiated spot, mode scrambling is required. Here, mode scrambling denotes a process for inducing the interchange of optical power between modes in an optical waveguide, e.g., by winding an optical fiber while bending the optical fiber within the range of allowable bend radii of the fiber. However, since this mode scrambling requires the winding of an optical fiber, the optical fiber may be broken, and the size of a mode scrambling device (mode scrambler) may increase. In addition, sufficiently uniform light intensities cannot be obtained by merely winding an optical fiber having a length of hundreds of meters. This decreases processing efficiency.

PATENT DOCUMENT 1 describes an optical waveguide fiber including a core material functioning to allow light to propagate and having a rectangular cross section. Furthermore, PATENT DOCUMENT 1 describes that the optical waveguide fiber functions to obtain a uniform light intensity distribution. In view of the above, it has been widely known that the use of an optical fiber including a core having a rectangular cross section allows the irradiation intensities of a laser beam at the spot irradiated with the laser beam to be uniform.

PATENT DOCUMENT 1: Japanese Examined Patent Publication No. H03-49591

SUMMARY OF THE INVENTION

Technical Problem

Incidentally, an optical fiber having a two-layer structure includes a core having a rectangular cross section and made of quartz, and a cladding surrounding the core and made of quartz doped with fluorine, etc. The cladding of the optical fiber tends to be more brittle than the core thereof. Therefore, fusion or polishing of an end of the fiber may cause the cladding to partially collapse and cause the corners of a cross section of the core to collapse. This may prevent the rectangular outer cross-sectional shape of the core from being maintained. This decreases the uniformity of the irradiation intensities of a laser beam at the spot irradiated with the laser beam.

The present invention has been made in view of the foregoing point, and it is an object of the invention is to emit a laser beam with uniform irradiation intensities while maintaining a rectangular outer cross-sectional shape of a core.

Solution to the Problem

In order to achieve the above object, an optical fiber according to the present invention includes: a core having a rectangular cross section and made of quartz; a low-refractive-index cladding surrounding the core, having a circular outer cross-sectional shape, and made of resin; and a support layer surrounding the cladding and made of quartz.

Specifically, the optical fiber according to the present invention includes: a core having an oblong rectangular or square outer cross-sectional shape and made of quartz; a cladding surrounding the core, having a circular outer cross-sectional shape, having a lower refractive index than the core, and made of resin; and a support layer surrounding the cladding and made of quartz.

With the structure described above, the brittle, low-strength cladding having a lower refractive index than the core and made of quartz doped with, e.g., fluorine surrounds the core having a rectangular cross section and made of quartz. However, since the support layer made of quartz used also as the material of the core surrounds the cladding, this reduces the collapse of the cladding and the collapse of the corners of a cross section of the core even with fusion or polishing of an end part of the fiber. This allows the rectangular outer cross-sectional shape of the core to be maintained, thereby enabling the maintenance of the uniformity of the irradiation intensities of a laser beam at the spot irradiated with the laser beam. In view of the above, a laser beam with uniform irradiation intensities can be emitted while the rectangular outer cross-sectional shape of the core is maintained.

The optical fiber may further include: a protection layer surrounding the support layer and having a higher refractive index than the support layer.

With the structure described above, since the high-refractive-index protection layer surrounds the support layer, escaping ones of laser beams transmitted through the core can be transferred through the support layer and the protection layer to the outside of the fiber. This increases the uniformity of the irradiation intensities of a laser beam emitted from the exit end of the optical fiber at the spot irradiated with the laser beam.

One end part of the optical fiber may include a quartz rod configured to allow a laser beam to enter the core and made of quartz.

With the structure described above, since one end part of the fiber includes the quartz rod having a relatively high light resistance and made of quartz, damage to a part of the core corresponding to the end part of the fiber can be reduced even with the launch of a laser beam with high energy density into the corresponding end surface of the fiber.

The cladding may be doped with at least one of fluorine and boron.

With the structure described above, since the cladding is made of quartz doped with at least one of fluorine and boron, the refractive index of the cladding is specifically lower than that of the core (and the support layer) made of quartz.

Advantages of the Invention

According to the present invention, an optical fiber includes a core having a rectangular cross section and made of quartz, a low-refractive-index cladding surrounding the core, having a circular outer cross-sectional shape, and made of quartz, and a support layer surrounding the cladding and made of quartz. Therefore, a laser beam with uniform irradiation intensities can be emitted while the rectangular outer cross-sectional shape of the core is maintained.

Figure 1:
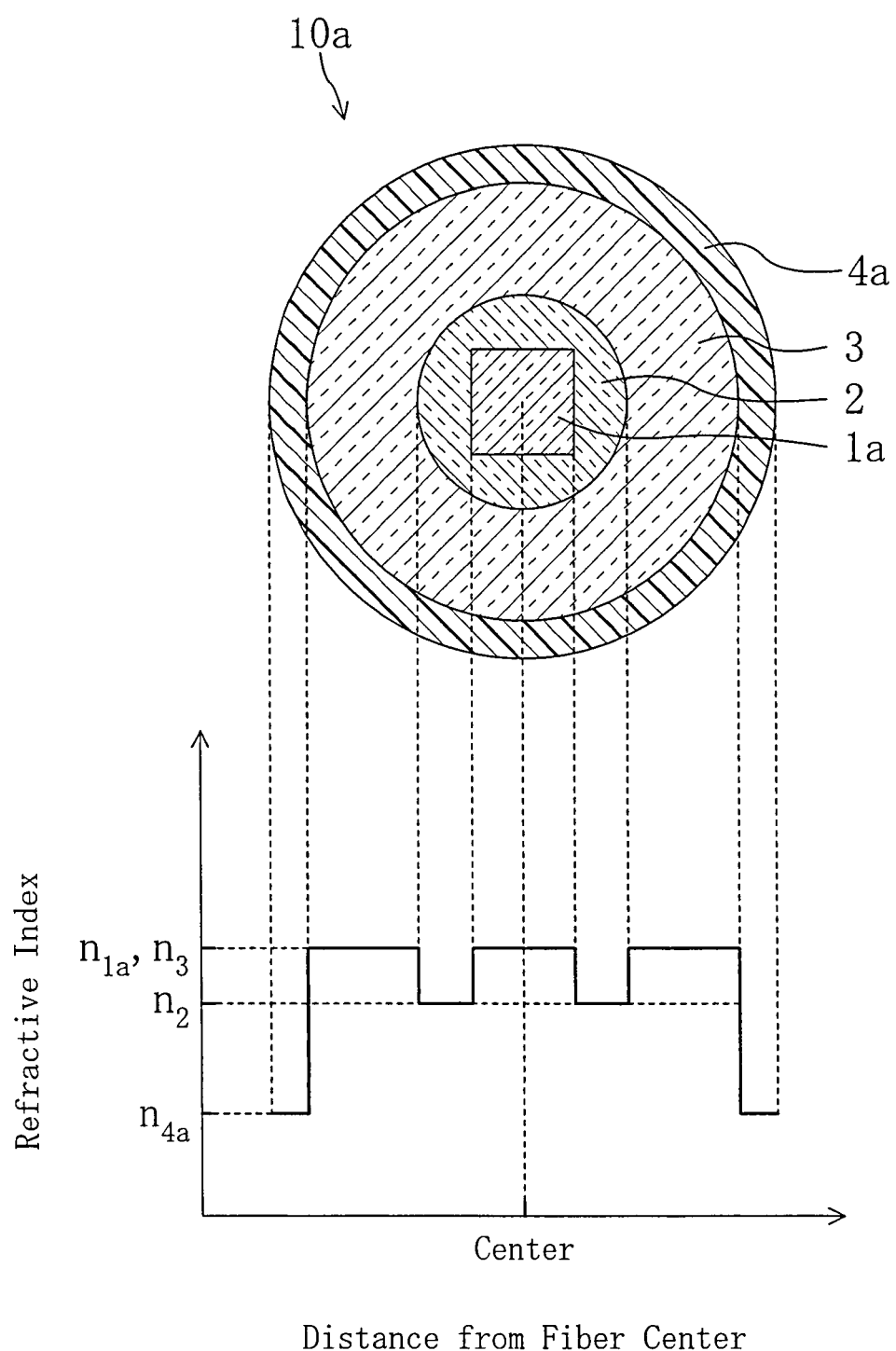
FIG. 1 is a schematic view illustrating a cross section of an optical fiber 10a according to a first embodiment and the refractive index profile thereof.

DESCRIPTION OF REFERENCE CHARACTERS 1, 1a, 1b Core
2 Cladding
3 Support Layer
4, 4a, 4b Protection Layer
5 Quartz Rod
10a, 10b, 10c Optical Fiber

DESCRIPTION OF EMBODIMENTS

Embodiments of the present invention will be described hereinafter with reference to the drawings. The present invention is not limited to the following embodiments.

First Embodiment of the Invention

FIG. 1 is a schematic view illustrating a cross section of an optical fiber 10a according to this embodiment and the refractive index profile thereof.

As illustrated in FIG. 1, the optical fiber 10a includes a centrally located core 1a having a square cross section, a cladding 2 surrounding the core 1a and having a circular outer cross-sectional shape, a tubular support layer 3 surrounding the cladding 2, and a tubular protection layer 4a surrounding the support layer 3.

The core 1a is made of quartz, and has a refractive index $n_{1a}$ ($n_{1a}=1.457$) substantially equal to that of pure quartz as illustrated in FIG. 1.

The cladding 2 is made of, e.g., quartz doped with fluorine, boron, etc., and has a lower refractive index $n_2$ (e.g., $n_2=1.443$) than pure quartz as illustrated in FIG. 1.

The support layer 3 is made of quartz, and has a refractive index $n_3$ ($n_3=1.457$) substantially equal to that of pure quartz as illustrated in FIG. 1.

The protection layer 4a is made of, e.g., a thermosetting silicone resin, has a lower refractive index $n_{4a}$ (e.g., $n_{4a}=1.40$) than the refractive index $n_2$ of the cladding 2 as illustrated in FIG. 1, and is provided to protect the core 1a, the cladding 2, and the support layer 3 from external shock and others.

The optical fiber 10a having the structure described above allows a laser beam entering the end of the core 1a corresponding to one fiber end to be transmitted while being repeatedly reflected off the interface between the core 1a and the cladding 2, and then to be emitted from the end of the core 1a corresponding to the other fiber end.

The optical fiber 10a having the structure described above can be fabricated in the following manner. Specifically, for example, a cladding layer having a circular outer cross-sectional shape and a square inner cross-sectional shape, and made of quartz doped with fluorine is formed inside a tubular support layer formation tube made of quartz, and a core material having a square cross section and made of quartz is disposed inside the cladding layer, thereby producing a preform. The preform is heated and stretched so as to be drawn into a fiber. Thereafter, the side surface of the fiber is coated with a thermosetting silicone resin, and then the coated fiber is sintered.

As described above, according to the optical fiber 10a of this embodiment, the brittle, low-strength cladding 2 having a lower refractive index than the core 1a and made of quartz doped with fluorine, boron, etc., surrounds the core 1a having a rectangular cross section and made of quartz. However, since the support layer 3 made of quartz used also as the material of the core 1a surrounds the cladding 2, this reduces the collapse of the cladding 2 and the collapse of the corners of a cross section of the core 1a even with fusion or polishing of an end of the fiber. This allows the rectangular outer cross-sectional shape of the core 1a to be maintained, thereby enabling the maintenance of the uniformity of the irradiation intensities of a laser beam at the spot irradiated with the laser beam. In view of the above, a laser beam with uniform irradiation intensities can be emitted while the rectangular outer cross-sectional shape of the core 1a is maintained. In addition, damage to the fiber itself due to a high-power laser beam can be reduced.

Second Embodiment of the Invention

Figure 2:
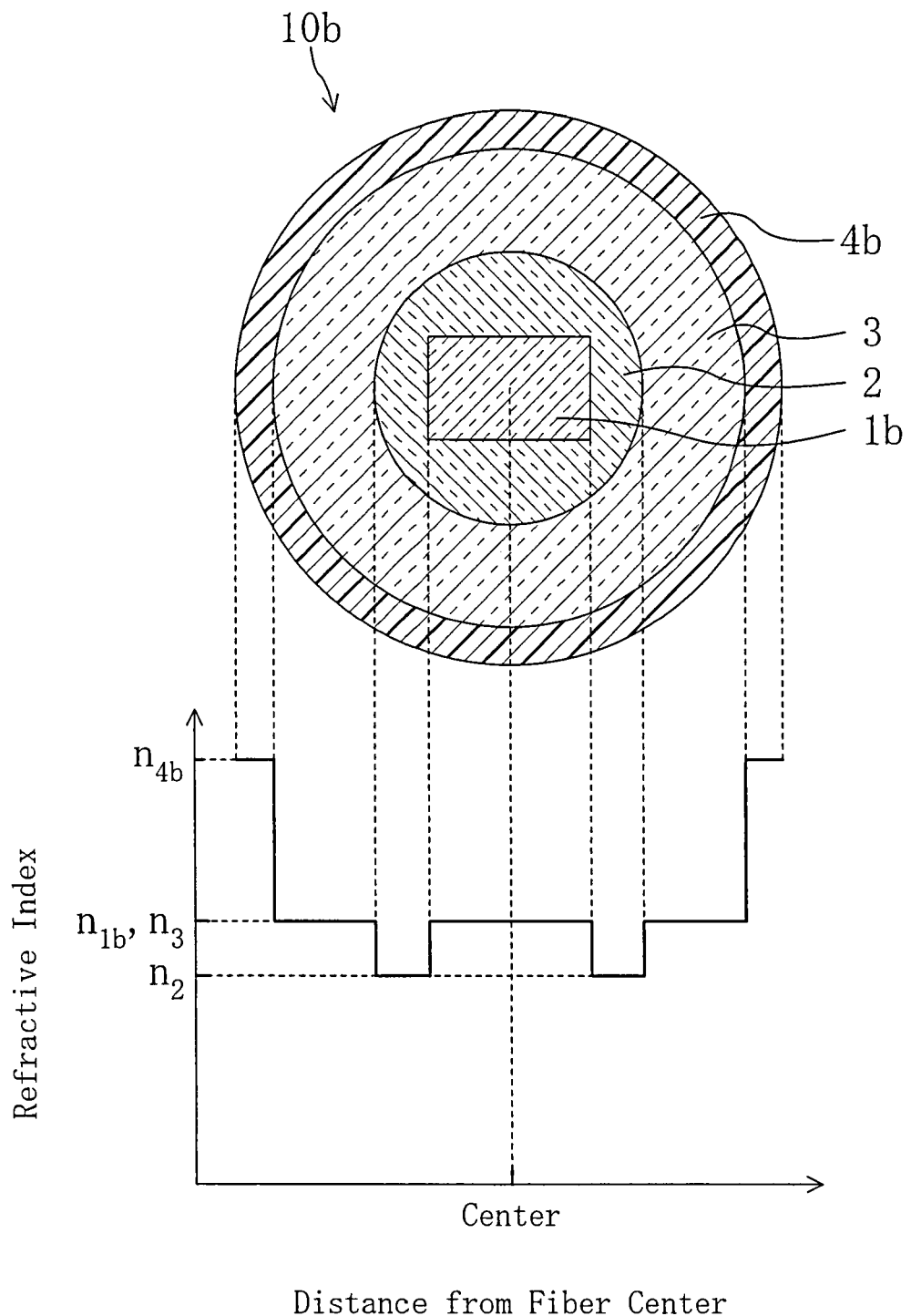
FIG. 2 is a schematic view illustrating a cross section of an optical fiber 10b according to a second embodiment and the refractive index profile thereof.

FIG. 2 is a schematic view illustrating a cross section of an optical fiber 10b according to this embodiment and the refractive index profile thereof. In the following embodiments, the same reference characters as those in FIG. 1 are used to represent equivalent elements, and the detailed explanation thereof will be omitted.

As illustrated in FIG. 2, the optical fiber 10b includes a centrally located core 1b having an oblong rectangular cross section, a cladding 2 surrounding the core 1b and having a circular outer cross-sectional shape, a tubular support layer 3 surrounding the cladding 2, and a tubular protection layer 4b surrounding the support layer 3.

The core 1b is made of quartz, and has a refractive index $n_{1b}$ ($n_{1b}=1.457$) substantially equal to that of pure quartz as illustrated in FIG. 2.

The protection layer 4b is made of, e.g., a thermosetting silicone resin, has a higher refractive index $n_{4b}$ (e.g., $n_{4b}=1.50$) than the refractive index $n_{1b}$ of the core 1b and the refractive index $n_3$ of the support layer 3 as illustrated in FIG. 2, and is provided to protect the core 1b, the cladding 2, and the support layer 3 from external shock and others.

The optical fiber 10b having the structure described above can be fabricated by changing the shape of the core material used in the first embodiment and the resin applied to the side surface of the fiber.

According to the optical fiber 10b of this embodiment, like the first embodiment, a laser beam with uniform irradiation intensities can be emitted while the rectangular outer cross-sectional shape of the core 1b is maintained. In addition, since the high-refractive-index protection layer 4b surrounds the support layer 3, escaping ones of laser beams transmitted through the core 1b can be transferred through the support layer 3 and the protection layer 4b to the outside of the fiber. This increases the uniformity of the irradiation intensities of a laser beam emitted from the exit end of the optical fiber at the spot irradiated with the laser beam.

Third Embodiment of the Invention

Figure 3:
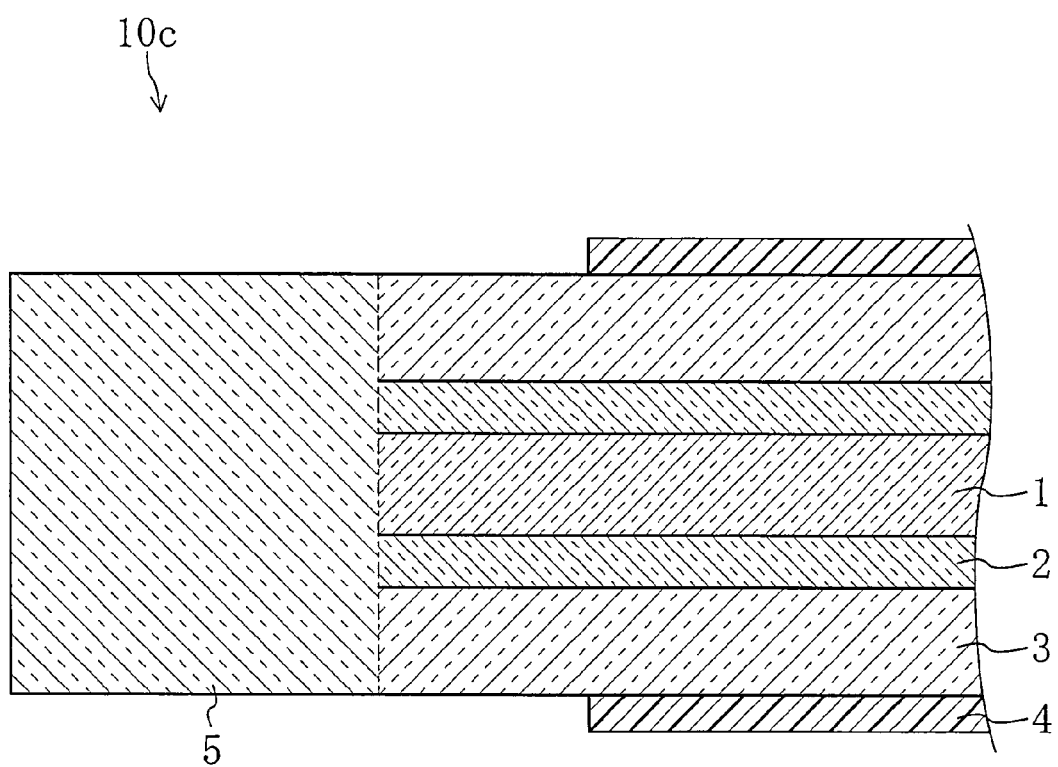
FIG. 3 is a longitudinal cross-sectional view of an optical fiber 10c according to a third embodiment.

FIG. 3 is a longitudinal cross-sectional view of an optical fiber 10c according to this embodiment.

As illustrated in FIG. 3, the optical fiber 10c includes a centrally located core 1 having a rectangular cross section, a cladding 2 surrounding the core 1 and having a circular outer cross-sectional shape, a tubular support layer 3 surrounding the cladding 2, and a tubular protection layer 4 surrounding the support layer 3. One of the fiber ends includes a quartz rod 5 configured to allow a laser beam to enter the core 1 and made of quartz. Here, the core 1 may have either a square cross section as described in the first embodiment or an oblong rectangular cross section as described in the second embodiment. The protection layer 4 may be made of either a material having a relatively low refractive index as described in the first embodiment or a material having a relatively high refractive index as described in the second embodiment.

Furthermore, as illustrated in FIG. 3, the outer side surface of a part of the support layer 3 corresponding to an end part of the optical fiber 10c is exposed from the protection layer 4. The quartz rod 5 is fusion-spliced to an end surface of a combination of the exposed part of the support layer 3, the cladding 2, and the core 1. In FIG. 3, the outside diameter of the quartz rod 5 coincides with that of the support layer 3. However, the outside diameter of the quartz rod 5 may be greater than that of the support layer 3. The quartz rod 5 may have a shape other than cylindrical. Alternatively, instead of the quartz rod 5, another optical fiber may be used.

The optical fiber 10c having the structure described above can be fabricated in the following manner. Specifically, an optical fiber (10a or 10b) is fabricated as described in the first or second embodiment, and then a part of the protection layer 4 corresponding to an end part of the optical fiber is removed. The quartz rod 5 is fusion-spliced to the corresponding end surface of the optical fiber with an optical fiber fusion splicer or others.

According to the optical fiber 10c of this embodiment, like the first embodiment, a laser beam with uniform irradiation intensities can be emitted while the rectangular outer cross-sectional shape of the core 1 is maintained. In addition, since one end part of the fiber includes the quartz rod 5 having a relatively high light resistance and made of quartz, damage to a part of the core 1 corresponding to the end part of the fiber can be reduced even with the launch of a laser beam with high energy density into the corresponding end surface of the fiber.

Other Embodiments

In the embodiments described above, an optical fiber including a cladding made of quartz doped with impurities, such as fluorine or boron, was described as an example. However, the present invention can be practiced also with an optical fiber including a cladding made of quartz and having a plurality of pores arranged to extend parallel to one another.

Furthermore, in the embodiments described above, an optical fiber having a side surface on which a protection layer (4a, 4b, or 4) is formed was described as an example. However, a coating layer made of, e.g., polyamide resin may surround the protection layer, thereby increasing the fiber strength.

INDUSTRIAL APPLICABILITY

As described above, according to the present invention, a laser beam with uniform irradiation intensities is emitted, and therefore, the present invention is useful for laser machining, such as a surface ablation process for semiconductor.

The invention claimed is:

1. An optical fiber comprising:
   a core having an oblong rectangular or square cross section and made of quartz;
   a cladding surrounding the core, having a circular outer cross-sectional shape, having a lower refractive index than the core, and made of quartz;
   a support layer surrounding the cladding and made of quartz; and
   a protection layer surrounding the support layer and having a higher refractive index than the support layer and the core, wherein
   the core and the support layer each have a refractive index substantially equal to a refractive index of pure quartz.

2. The optical fiber of claim 1, wherein
   one end part of the optical fiber includes a quartz rod configured to allow a laser beam to enter the core and made of quartz.

3. The optical fiber of claim 2, wherein
   a part of the support layer corresponding to the one end part of the optical fiber is exposed from the protection layer,
   the quartz rod forming a cylindrical shape is fusion-spliced to an end surface of a combination of the exposed part of the support layer, the cladding, and the core, and
   a diameter of the quartz rod substantially coincides with an outside diameter of the support layer.

4. The optical fiber of claim 1, wherein
   the cladding is doped with at least one of fluorine and boron.

5. The optical fiber of claim 1, wherein
   the protection layer is made of a silicone resin.

* * * * *